(12) United States Patent
Hofmann et al.

(10) Patent No.: US 6,808,211 B2
(45) Date of Patent: Oct. 26, 2004

(54) COUPLING FOR CONNECTING TWO COMPONENTS CONVEYING A MEDIUM

(75) Inventors: Jürgen Hofmann, Melsungen (DE); Rolf-Dieter Schlein, Rotenburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/229,664

(22) Filed: Aug. 27, 2002

(65) Prior Publication Data

US 2003/0080559 A1 May 1, 2003

(30) Foreign Application Priority Data

Aug. 28, 2001 (DE) .......................................... 101 41 315

(51) Int. Cl.[7] .............................................. F16L 37/00
(52) U.S. Cl. ...................... 285/305; 285/321; 285/403
(58) Field of Search ................................ 285/305, 317, 285/321, 400, 403

(56) References Cited

U.S. PATENT DOCUMENTS

| | | | |
|---|---|---|---|
| 4,561,682 A | * 12/1985 | Tisserat | 285/305 |
| 4,591,192 A | * 5/1986 | Van Exel et al. | 285/83 |
| 5,275,443 A | * 1/1994 | Klinger | 285/82 |
| 5,542,716 A | * 8/1996 | Szabo et al. | 285/305 |
| 5,593,187 A | * 1/1997 | Okuda et al. | 285/305 |
| 5,704,658 A | * 1/1998 | Tozaki et al. | 285/305 |
| 5,765,877 A | * 6/1998 | Sakane et al. | 285/93 |
| 5,964,483 A | * 10/1999 | Long et al. | 285/305 |
| 6,027,143 A | * 2/2000 | Berg et al. | 285/93 |

FOREIGN PATENT DOCUMENTS

| | | | | |
|---|---|---|---|---|
| DE | 2444993 | | 4/1976 | |
| EP | 0719971 | | 7/1996 | |
| WO | 9314341 | * | 7/1993 | 285/305 |

* cited by examiner

Primary Examiner—David Bochna
(74) Attorney, Agent, or Firm—Martin A. Farber

(57) ABSTRACT

In a coupling for the connection of a washing-liquid pipe in a motor vehicle to another component, a catching element (3) designed for connecting two coupling parts (1, 2) has a shell (9) of C-shaped cross section intended for gripping. Catching noses (6) project radially inwardly from the shell (9). By this, mounting and demounting of the catching element (3) are especially simple.

18 Claims, 1 Drawing Sheet

COUPLING FOR CONNECTING TWO COMPONENTS CONVEYING A MEDIUM

FIELD OF THE INVENTION

The invention relates to a coupling for connecting two components conveying a medium, in particular for the connection of a washing-liquid pipe in a motor vehicle to another component, with a first coupling part and with a second coupling part which can be connected to the first coupling part and with a catching element, comprising catching noses, for holding the second coupling part on the first coupling part, the catching element being of C-shaped design in cross section.

Such couplings are frequently used in modern windshield cleaning systems of motor vehicles and are known from practical applications. In these couplings, the second coupling part is as a rule prestressed by the catching element against an inner edge of the first coupling part which is in most cases of pot-shaped design. The catching noses pass through the first coupling part in cutouts and engage behind a shoulder of the second coupling part. In this connection, the catching element is designed as a plane part ring and, for example, punched out of spring steel.

In the known coupling, it is disadvantageous that the catching element is very difficult to grip. In most cases, therefore, a lug is fastened to the outside of the catching element, to which lug a tool can be applied. However, this lug often leads to damage to lines and cables which rub against it. Furthermore, a tool is necessary for removing the catching element.

SUMMARY OF THE INVENTION

The problem underlying the invention is that of designing a coupling of the type referred to in the introduction in such a manner that it is as simple as possible to assemble and damage to adjacent components is reliably prevented.

According to the invention, this problem is solved by virtue of the fact that the catching element has a shell with a height designed for gripping with fingers.

By virtue of this design, the catching element can be gripped by hand in the sleeve region. It is therefore possible to dispense with a lug for gripping the catching element. Owing to the invention, a tool is not required for disconnecting the coupling. Since, owing to the invention, the catching element needs no lug, damage to lines and cables rubbing along the catching element is reliably avoided. Another advantage of the coupling according to the invention is that the direction for disengaging the catching element is freely selectable, since the shell can be gripped over virtually the entire circumference, whereas the lug of the known coupling extends over only a part area of the circumference. This leads, in particular in the case of a coupling used in a motor vehicle, to great simplification of mounting, since very little construction space is in most cases available here. Furthermore, the shell has especially great stability in comparison with a flat part ring, so that the catching element can be manufactured from a very cost-effective material. For gripping with the fingers, the shell can have a height of, for example, roughly 10 mm.

The catching noses could, for example, be arranged close to the end side of the shell. According to an advantageous development of the invention, distortion or twisting of the catching element during mounting on the coupling pieces can be avoided if the catching noses are arranged in a central region of the catching element.

According to another advantageous development of the invention, the catching element can be pre-assembled with the first coupling piece to form a unit if the catching noses have ramps facing in the mounting direction of the second coupling part on their free ends. For connection of the coupling parts, the second coupling part can simply be inserted into the first coupling part until the catching element snaps behind the shoulder of the second coupling part.

According to another advantageous development of the invention, a contribution is made to further reducing the risk of damage to components rubbing against the catching element if the catching element has chamfers on each of its end sides.

According to another advantageous development of the invention, a contribution is made to further simplifying the gripping of the catching element if the catching element has grip grooves or grip knobs on its outside.

According to another advantageous development of the invention, demounting of the catching element is especially simple if the catching noses, seen in a cross section of the catching element, are of continuously tapering design. By virtue of this, the catching element can simply be rotated for its demounting. The catching noses slide into the cutouts of the first coupling part and in doing so bend the shell open.

According to another advantageous embodiment of the invention, a contribution is made to further simplifying the demounting of the catching element if the cutouts have a funnel shape in a cross section of the first coupling part. By virtue of this design, the cutouts and the catching noses have ramps bearing against one another facing in the direction of rotation of the catching element.

The coupling according to the invention proves to be especially cost-effective if the catching element is made of plastic. The stability necessary for the prestressing can be produced by suitable selection of the shape and the dimensions of the catching element.

Numerous embodiments of the invention are possible. To further clarify its basic principle, one of these is described below and illustrated in the drawing, in which

DETAILED DESCRIPTION OF THE PREFERRED EMBODIMENTS

Figure 1:
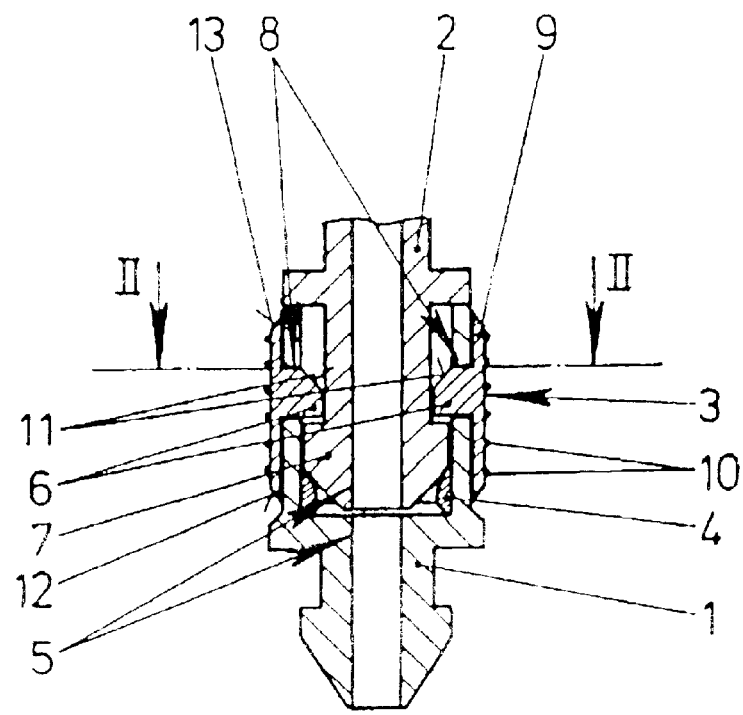
FIG. 1 shows a longitudinal section through a coupling according to the invention.

FIG. 1 shows a coupling with a first coupling part 1 of pot-shaped design and with a second coupling part 2 inserted into the first coupling part 1. The second coupling part 2 is prestressed by means of a catching element 3 against a sealing ring 4 arranged in the bottom region of the first coupling part 1. The coupling parts 1, 2 each have a duct 5 for conducting washing liquid in a motor vehicle and can, for example, be intended for the connection of a washing-liquid pipe to a container. One of the coupling parts 1, 2 can also be designed as a distributor. The second coupling part 2 is of mushroom-shaped design and has an edge 7 running around it, behind which catching noses 6 of the catching element 3 engage. The catching noses 6 of the catching element 3 pass through the first coupling part 1 in the region of cutouts 8. The catching noses 6 are arranged in a central region of a shell 9 of the catching element 3. Grip knobs 10 are arranged on the outside of the shell 9. FIG. 1 also shows that the catching noses 6 have ramps 11. These ramps 11 make possible radial movement of the catching noses 6 outward on connection of the coupling parts 1, 2. The shell 9 has chamfers 12, 13 on each of its end sides. These chamfers 12, 13 prevent damage to components in the motor vehicle which rub along the coupling. As an alternative to this, the shell 9 can also be arranged in a sunk position in a recess (not shown) running around the first coupling part 1.

Figure 2:
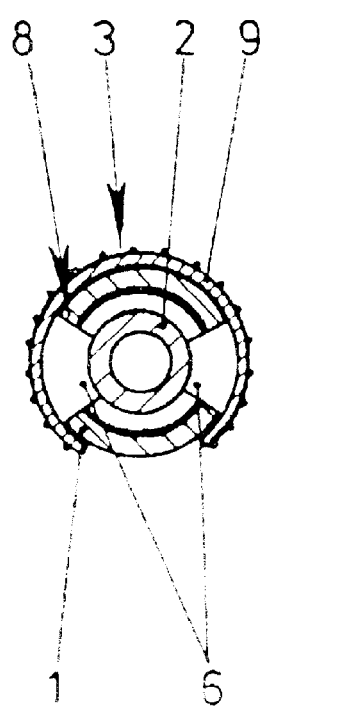
FIG. 2 shows a sectional illustration through the coupling according to the invention from FIG. 1.
Figure 3:
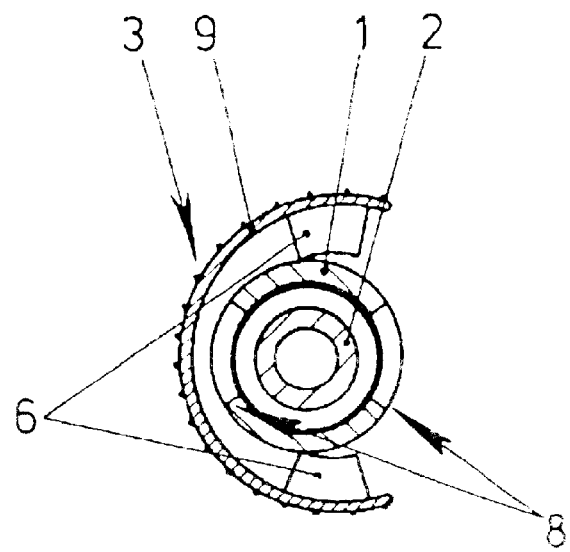
FIG. 3 shows a sectional illustration through the coupling according to the invention from FIG. 1 with the catching element disengaged.

FIG. 2 shows in a sectional illustration through the coupling from FIG. 1 along the line II—II that the catching element 3 is of C-shaped design in cross section. To separate the coupling parts 1, 2, the catching element 3 can be bent open, so that the catching noses 6 move out of the movement area of the second coupling part 2. This position is illustrated in FIG. 3. FIGS. 2 and 3 also show that, in the section illustrated and thus transversely to the movement direction of the second coupling part 2, the catching noses 6 are of tapering design toward their free end. In the section illustrated, the cutouts 8 of the first coupling part 1 have a funnel shape. Starting from the closed position of the coupling illustrated in FIG. 2, the catching element 3 can therefore be rotated so that the shell 9 bends open and the catching noses 6 first move out of the movement area of the second coupling part 2 and, on further rotation, out of the cutouts 8 of the first coupling part 1.

What is claimed is:

1. A coupling for connecting two components conveying a medium, for connection of a washing-liquid pipe in a motor vehicle to another component, with a first coupling part and with a second coupling part which is able to be connected to the first coupling part and with a catching element, said catching element comprising catching noses, for holding the second coupling part on the first coupling part, the catching element is of C-shaped design in cross-section, wherein the catching element (3) has a shell (9) with a height, the catching noses extend radially inward from the shell, wherein the height of the shell corresponds a several times the amount of the height of the catching noses and the shell covers the first coupling part more than 180°, wherein the catching element (3) has chamfers (12, 13) on each of its end sides.

2. The coupling as claimed in claim 1, wherein the catching noses (6) are arranged in a central region of the catching element (3).

3. The coupling as claimed in claim 1, wherein a free end of the catching noses (6) have ramps (11) facing in mounting direction of the second coupling part (2).

4. The coupling as claimed in claim 1, wherein the catching element (3) has grip grooves or grip knobs (10) on its outside.

5. The coupling as claimed in claim 1, wherein the catching noses (6) are tapered.

6. The coupling as claimed in claim 1, wherein the catching element (3) is made of plastic.

7. A coupling for connecting two components conveying a medium, for connection of a washing-liquid pipe in a motor vehicle to another component, with a first coupling part and with a second coupling part which is able to be connected to the first coupling part and with a catching element, said catching element comprising catching noses, for holding the second coupling part on the first coupling part, the catching element being of C-shaped design in cross-section, wherein the catching element (3) has a shell (9) with a height, the catching noses extend radially inward from the shell, wherein the height of the shell corresponds to several times the amount of the height of the catching noses and the shell covers the first coupling part more than 180°, wherein cutouts (8) have a funnel shape.

8. The coupling as claimed in claim 7, wherein the catching element (3) is made of plastic.

9. The coupling as claimed in claim 7, wherein the catching element (3) has grip grooves or grip knobs (10) on its outside.

10. A coupling for connecting two components comprising a first coupling part including a sealing ring,
a second coupling part for insertion into said first coupling part, said second coupling part having a ring extending therearound,
a catching element having catching noses for pre-stressing said second coupling against said sealing ring of said first coupling part, said catching element further including a shell having a height greater than a height of said catching noses, and
a duct passing through each of said first and second coupling parts for passing a liquid therethrough, wherein upon insertion of said second coupling part into said first coupling part, said catching noses pass through said first coupling part and are engaged behind said edge of said second coupling part for retaining said second coupling within said first coupling,
wherein said catching element includes chamfers on each end thereof for reducing the risk of damage to components contacting said catching element.

11. The coupling as recited in claim 10, wherein said catching noses extend radially inward from said shell.

12. The coupling as recited in claim 10, wherein said first coupling part has a cup shape and said second coupling part has an enlarged head forming a mushroom shape.

13. The coupling as recited in claim 10, wherein said shell includes at least one grip knob arranged on an outside of said shell.

14. The coupling as recited in claim 10, wherein said catching noses include ramps for allowing outward radial movement upon connection of said second coupling part to said first coupling part.

15. The coupling as recited in claim 10, wherein said shell covers said first coupling part more than 180°.

16. The coupling as recited in claim 10, wherein said shell has a height substantially 10 millimeters.

17. The coupling as recited in claim 10, wherein said shell is selectively grippable over the entire circumference thereof.

18. The coupling as recited in claim 10, wherein said catching element is C-shaped.

* * * * *